United States Patent [19]

Newman et al.

[11] Patent Number: 4,942,078
[45] Date of Patent: Jul. 17, 1990

[54] ELECTRICALLY HEATED STRUCTURAL COMPOSITE AND METHOD OF ITS MANUFACTURE

[75] Inventors: Paul R. Newman, Newbury Park; Patricia H. Cunningham, Thousand Oaks, both of Calif.

[73] Assignee: Rockwell International Corporation, El Segundo, Calif.

[21] Appl. No.: 252,210

[22] Filed: Sep. 30, 1988

[51] Int. Cl.$^5$ .................... B64D 15/12; H05B 3/10
[52] U.S. Cl. .................... 428/192; 219/528; 219/529; 219/548; 244/134 R; 244/134 C; 428/251; 428/265; 428/268; 428/273; 428/285; 428/320.2; 428/411.1; 428/415; 428/417; 428/426; 428/435; 428/515
[58] Field of Search ............... 219/548, 549, 528, 529; 338/212, 214; 427/121; 428/265, 268, 192, 515, 413, 901, 411.1, 415, 417, 435, 320.2, 251, 273, 285, 426; 204/59 R, 134 C; 244/134 R

[56] References Cited

U.S. PATENT DOCUMENTS

| 3,529,074 | 9/1970 | Lewis | 174/68.5 |
| 3,627,988 | 12/1971 | Romaniec | 219/529 |
| 3,973,103 | 8/1976 | Tadewald | 219/548 |
| 4,158,078 | 6/1979 | Egger et al. | 219/548 |
| 4,214,031 | 7/1980 | Miyakawa et al. | 428/213 |
| 4,320,286 | 3/1982 | Borrup | 219/549 |
| 4,384,401 | 5/1983 | Borrup | 29/611 |
| 4,402,779 | 9/1983 | Levy | 156/245 |
| 4,429,216 | 1/1984 | Brigham | 219/528 |
| 4,566,955 | 1/1986 | Naamann | 204/59 R |
| 4,582,575 | 4/1986 | Warren et al. | 528/423 |
| 4,599,255 | 7/1986 | Anglin et al. | 526/838 |
| 4,617,228 | 10/1986 | Newman et al. | 646/717 |
| 4,680,236 | 6/1987 | Myers et al. | 428/515 |
| 4,692,225 | 9/1987 | Witucki et al. | 428/265 |
| 4,696,835 | 9/1987 | Maus et al. | 427/121 |
| 4,697,000 | 9/1987 | Witucki et al. | 428/265 |
| 4,697,001 | 9/1987 | Walker et al. | 428/268 |
| 4,710,401 | 12/1987 | Warren et al. | 427/121 |

Primary Examiner—Ellis P. Robinson
Assistant Examiner—Archene A. Turner
Attorney, Agent, or Firm—Charles T. Silberberg; Lawrence N. Ginsberg

[57] ABSTRACT

An electrically conductive structural composite which can be heated by application of an electrical current. The structural composite includes a plurality of layers of structural fabric which have been treated and prepreged with a laminating resin and cured into a laminate structure. At least one of the layers of fabric is rendered conductive by being treated with conductive polymer produced by the steps of contacting an electrically insulating porous structural fabric with a liquid pyrrole; contacting the electrically insulating porous structural fabric with a solution of a strong oxidant capable of oxidizing pyrrole to a pyrrole polymer; and, oxidizing the pyrrole by the strong oxidant in the presence of a substantially non-nucleophilic anion and precipitating a conductive pyrrole polymer in the pores of the structural fabric. Electrical conducting means in electrical contact with the conductive layer are utilized for providing passage of electrical current for joule heating of the structural composite. The structural composite has been found to be particularly useful as an airplane surface which is capable of anti-icing and de-icing.

9 Claims, 2 Drawing Sheets

ELECTRICALLY HEATED STRUCTURAL COMPOSITE AND METHOD OF ITS MANUFACTURE

BACKGROUND OF THE INVENTION

1. Field of the Invention

The present invention relates to the heating of structural materials and more particularly to a structural composite which is electrically conductive and can be electrically heated.

2. Description of the Related Art

Ice forms on the forward-facing surfaces of an aircraft when it flies through clouds of super-cooled water droplets, i.e. droplets having temperatures less than 32° F. These droplets, which are very small (typically 20 microns in diameter, compared to 1,000 microns for a rain droplet) freeze almost instantaneously upon impact with the aircraft, resulting in the formation of ice. When it is determined that ice build up is unacceptable, then measurements must be taken to assure that no ice build up occurs or is at least kept within acceptable limits. There are essentially two means for providing "active" ice protection (ice protection provided by systems carried on board the aircraft as opposed to passive means, such as accelerating the aircraft to such a speed that aerodynamic heating maintains the ice accreting surfaces above freezing)—de-icing and anti-icing.

In de-icing, ice is allowed to build up on the protected surfaces then periodically shed before its size/thickness becomes unacceptable. Typical systems used for de-icing include electro-thermal systems and mechanical systems. Electro-thermal systems utilize a component's electrical resistance heating. Examples include wires, etched foil or spray coatings. Mechanical systems include pneumatic "boots".

For anti-icing, ice may or may not be allowed to initially accrete on the protected surface; however, once the ice is shed the surface is maintained ice-free by the anti-icing system for the remainder of the ice encounter. Electro-thermal systems using electrical resistance heating are used for de-icing in a similar manner as they are used for anti-icing; but, the electrical power is continuously applied so as to maintain surface temperatures above freezing. Other typically used anti-icing systems include hot gas systems and chemical fluid systems. Hot gas systems are usually designed directly into the structure of the aircraft and utilize hot air bleed from the engine as a source of heat. Chemical fluid anti-icing is accomplished by dispensing a fluid onto the surface to be iced, through small holes in the surface. These fluids depress the freezing temperature of water on the surface well below 32° F. so that the impinging water droplets do not form ice.

De-icing and anti-icing problems associated with airplanes include the wing, upon which unsymmetrical ice shedding may cause roll problems. Furthermore, wing leading edge ice causes drag increase, loss of lift and increased stall speed. Ice on the leading edge of the engine inlet may damage the engine while shedding. The formation of ice must be controlled on the leading edges of the horizontal and vertical stabilizers in order to prevent tail flutter. Ice formation must be controlled on the ailerons and flaps. Ice formation must also be controlled on the pitot tube drain and balance horns.

Disadvantages of thermal hot gas systems include the fact that they require high energy. Furthermore, future and some current engines cannot provide adequate bleed air. Chemical fluid systems are deficient in that they are time limited, have high weight and are expensive. Mechanical pneumatic boots suffer from rain/sand erosion. Furthermore, they require high maintenance, have limited life, result in increased drag and may collect residual ice. Current electro-thermal systems require high energy, are heavy and are expensive. Specifically, composite structural materials which utilize embedded electric wires through which current is passed to heat the composite structures are deficient inasmuch as the wires usually have a deleterious effect on the mechanical properties of the structure. The use of electrically conductive composites on aircraft has previously been described in the literature. However, such uses have not been for the purpose of de-icing or anti-icing. U.S. Pat. No. 4,599,255 entitled "Composite Structures Having Conductive Surfaces", issued to J. M. Anglin et al, discloses a conductive composite structural member for use in an aircraft structure for providing P-static conductivity, lightning strike protection, electrical shielding capability, and conductivity for antenna ground plane useage.

OBJECTS AND SUMMARY OF THE INVENTION

A principle object of the present invention, therefore, is to heat a composite structure while maintaining its structural integrity.

Another object of the invention is to provide a structural composite which is electrically conductive and can be electrically heated.

Yet another object of the present invention is to provide structural members for aircraft which have the capability of de-icing and/or anti-icing without impairment of structural integrity.

Yet another object of the invention is to provide a method for manufacturing an electrically conductive structural composite which can be heated by application of an electrical current.

Other objects, advantages and novel features of the present invention will become apparent from the following detailed description of the invention when considered in conjunction with the accompanying drawings.

These objects are achieved by the present invention which is an electrically conductive structural composite which can be heated by application of an electrical current. In its broadest aspects, the structural composite includes a plurality of layers of structural fabric which have been treated and prepreged with a laminating resin and cured into a laminate structure. At least one of the layers of fabric is conductive by virtue of being treated with a sizing of conductive polymer produced by the steps of contacting an electrically insulating porous structural fabric with a liquid pyrrole., contacting the electrically insulating porous structural fabric with a solution of a strong oxidant capable of oxidizing pyrrole to a pyrrole polymer; and, oxidizing the pyrrole by the strong oxidant in the presence of a substantially non-nucleophilic anion and precipitating a conductive pyrrole polymer in the pores of the structural fabric. Electrical conducting means in electrical contact with the conductive layer are utilized for providing passage of electrical current for joule heating of the structural composite. The structural composite has been found to be particularly useful as an airplane surface which is capable of anti-icing and de-icing. However, it is useful in other areas of technology where a combination of structural and thermal heating properties is desired. For example, it may be used as a means of temperature control for cold-service electronics, or, for de-icing of walkways or ladders or ships.

Co-applicant P. R. Newman is a co-inventor of U.S. Pat. No. 4,617,228 entitled "Process For Producing Electrically Conductive Composite and Composites Produced Therein", assigned to the same assignee. That patent claims and discloses the conductive layer of conductive polymer which is utilized by the present invention. U.S. Pat. No. 4,617,288 is hereby incorporated by reference. The original intended application of the composite was for electromagnetic absorption and electromagnetic shielding to prevent EMI interference. It was found to be particularly useful for that application because it allows incorporation of controlled electromagnetic response characteristics into structural composite elements.

While the above-described use of the electrically conductive composite disclosed in the '228 patent is known, it is not clear that such a composition is useful when integrated into a laminate structure and heated by application of electrical current. Present applicants have unexpectedly discovered that use of this electrically conductive composite in a laminate structure is uniquely suitable for the purposes of joule heating, being inexpensive and yielding superior heating performance when it is incorporated into a laminate.

BRIEF DESCRIPTION OF THE DRAWINGS

The same elements or parts throughout the figures of the drawings are designated by the same reference characters.

DETAILED DESCRIPTION OF THE PREFERRED EMBODIMENT

Figure 1:
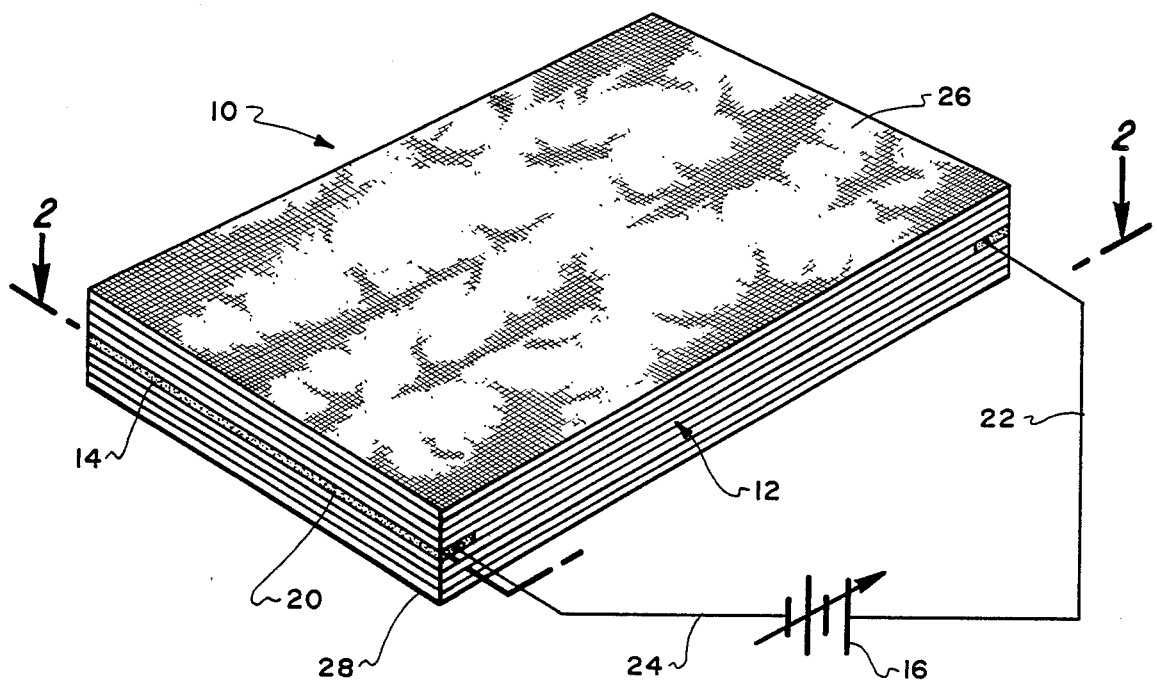
FIG. 1 is a perspective view of the structural composite laminate of the present invention.

Referring to the drawings and the characters of reference marked thereon, the electrically conductive structural composite of the present invention is generally designated 10 in FIG. 1. Composite 10 is formed of a plurality of layers of structural fabric which have been treated and prepreged with a laminating resin and cured into a laminate structure as more fully described below. At least one of the layers is a conductive layer 12 of structural fabric which has been treated with conductive polymer, produced by the process fully described and claimed in U.S. Pat. No. 4,617,228 entitled "Process for Producing Electrically Conductive Composite and Composites Produced Therein", issued to co-applicant P. R. Newman and assigned to the same assignee. (As noted above, in the Summary of the Invention, U.S. Pat. No. 4,617,228 is incorporated by reference.) Electrical conducting means 14 which are in electrical contact with the conductive layer 12 provides passage of electrical current for joule heating of the structural composite 10 during activation of the energy source 16. The structural composite 10 is particularly adapted for use as an aircraft structure for de-icing and anti-icing. Inasmuch as the heating mechanism is incorporated into the structure as an intrinsic property of the material, it does not require the fabrication of additional heating elements which can contribute to complexity and cost in manufacturing.

Figure 2:
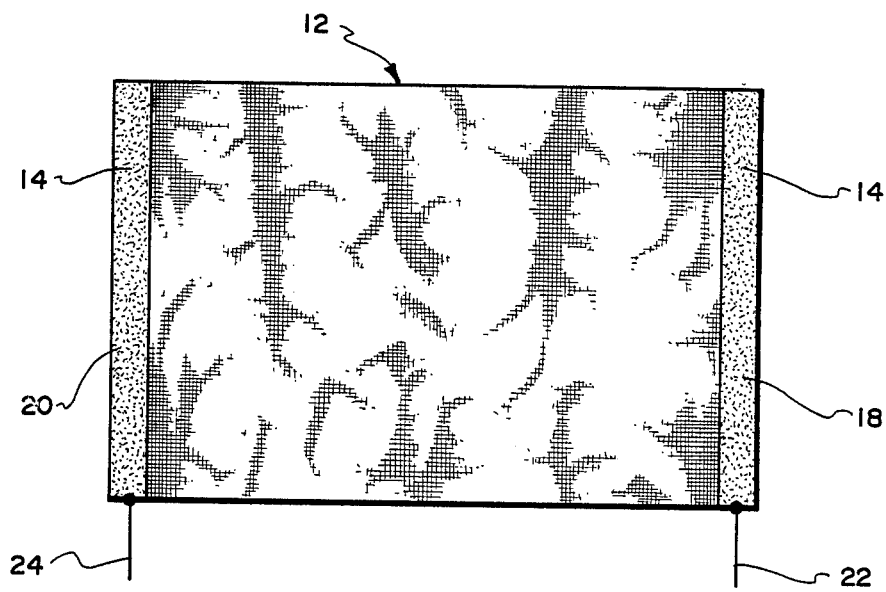
FIG. 2 is a view of the conductive layer of the structural composite taken along line 2—2 of FIG. 1.

As shown in a preferred embodiment of the conductive layer illustrated in FIG. 2, the electrical conducting means 14 includes a layer 18 of electrically conductive paint applied along one edge portion of the conductive layer and a second layer 20 of electrically conductive paint applied along an opposite edge portion of the conductive layer. Use of these layers of paint along these opposite edges provides for an even application of heat upon the introduction of an electric current. Electrical leads 22, 24 conduct electricity from layers 18, 20 to the electrical source 16 which may be an AC or DC source. It is preferred that the two outer layers 26, 28 be non-conducting layers of the structural fabric, thus preventing any electrical short circuits.

The electrically conductive structural composite of the present invention is manufactured by beginning with separate sheets of electrically insulating structural fabric such as a porous ceramic, a porous glass, e.g. a frit, a porous or articulated organic foam, e.g. polyurethane, a fabric, which can be woven or non-woven, e.g. fiberglass fabric, a mixed oxide fabric such as alumina/silica/boria fabric, e.g. Nextel, or a synthetic organic fabric such as Kevlar, a trademark of the DuPont Company, for aromatic polyamide fiber, a polyester such as Dacron cloth, and the like.

As previously noted, at least one of the sheets of the electrically insulating structural material is impregnated with a conductive polymer by the process described in U.S. Pat. No. 4,617,228. Briefly, in that process, the electrically insulating porous fabric is contacted with a liquid pyrrole. A strong oxidant capable of oxidizing pyrrole to a pyrrole polymer is contacted with the electrically insulating porous structural fabric. The pyrrole is then oxidized by the strong oxidant in the presence of a substantially non-nucleophilic anion and a conductive pyrrole polymer is precipitated in the pores of the structural fabric.

Each of the sheets of electrically insulating structural fabric (including the electrically insulating structural material) is prepreged according to standard laminate technology using partially cured thermosetting resins, such as an epoxy or polyimide, bismaleimide, or polyurethane. The sheets are then layered, the non-conductive layers preferably placed on the top and bottom of the structure for providing electrical insulation and thereby preventing short circuits. In the "laying up" step, the conductive and non-conductive sheets are built up according to the resistivity, weight and thickness requirements of the specific system. Standard laminate technology, including vacumn bag curing may be utilized to cure the layers into a finished laminate.

Electrical conducting means, for example wires and/or silver paint, are preferably embedded prior to impregnation and lamination; however, such electrical conducting means may be connected to the conductive layer after the laminate is formed.

The following is an example of a reduction to practice of the invention, it being understood that the example is only illustrative and in no sense limitative of the invention.

EXAMPLE

A piece of 7781 fiberglass fabric material marketed by Uniglass Industries, Los Angeles, Calif., was sprayed with an oxidant, ferric chloride. The oxidant was allowed to dry. A neat pyrrole was sprayed on the fabric and allowed to dry. The ferric chloride polymerized and doped the polymer to an electrically conductive state. The sheet was then washed in methanol and allowed to dry. Silver paint was painted on the 4 inch edges (4"×4½"). Each sheet, including both the conductive and non-conducting sheets, were painted with epoxy resin for impregnation (the curing agent utilized was Shell EPON, 9102,9150). Epoxy mix was then painted on the sheets. The sheets were dryed in a vacumn oven at 180° F. for 15 minutes, and then laid up in correct positions. In laying the sheets up, 6 layers were placed down and 4 wires, 2 on each 4" edge, were emplaced. Then 7 layers were layered on top. After being positioned together, the layered structure was placed in a vacumn bag for preventing bubbling in the resin (4 hours). An appropriate cure cycle was used for the resin. The laminate was then split into two equal halves, each having two leads on opposite sides of the individual laminate. The thermocouple wires (copper/-constantan) used to measure temperature changes on the finished laminate were held in place using GE varnish. One thermocouple was centered on the top layer of the structure, one was placed at a corner and a third was centered on an edge. Current from a power supply was connected to the two wires embedded in the finished laminate.

Figure 3:
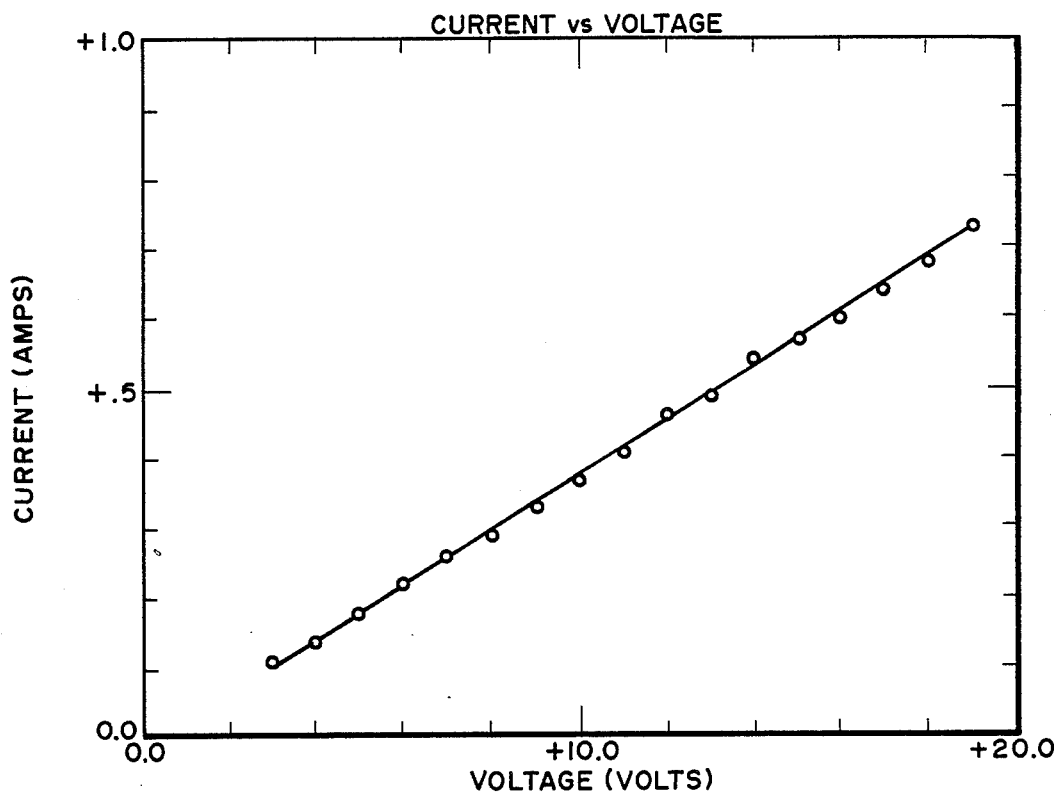
FIG. 3 is a plot of Current vs. Voltage, from a reduction to practice of the present invention, showing straight line resistance behavior of the panel over an entire range of operation.

FIG. 3 is an I-V plot showing straight-line (constant) resistance behavior of the panel over an entire range of operation.

Figure 4:
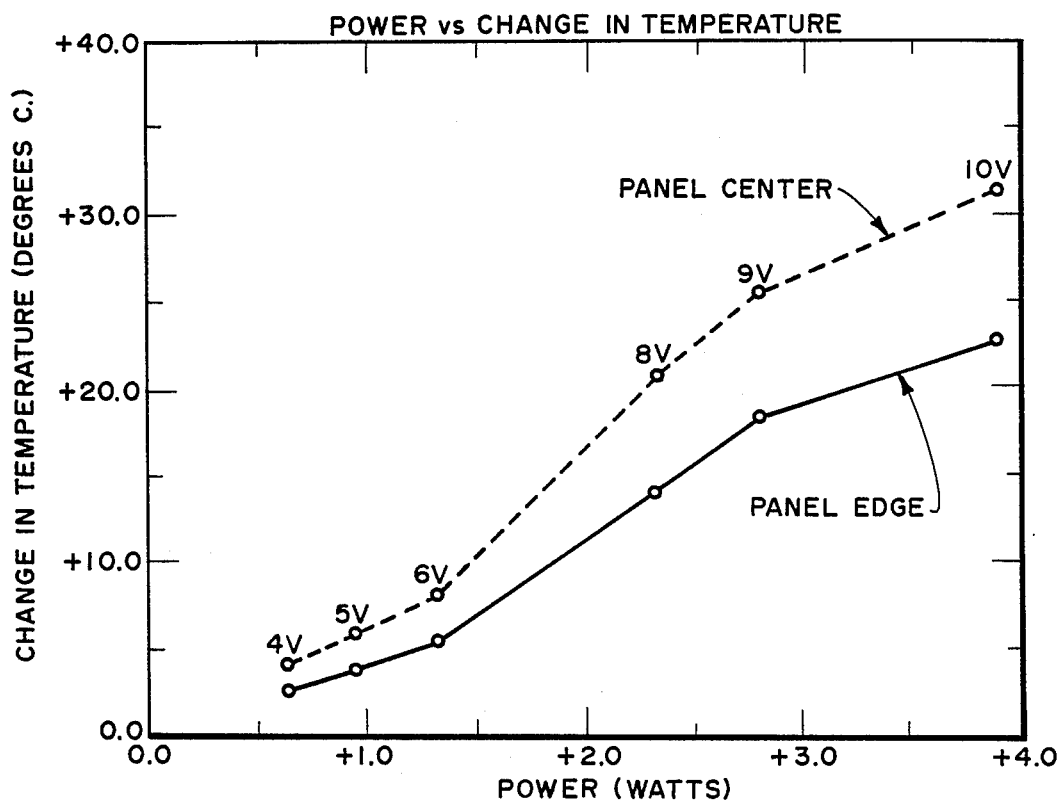
FIG. 4 is a plot of change in temperature vs. power, for the same reduction to practice.

FIG. 4 shows the increase in temperature relative to room temperature plotted as a function of the electric power applied to the two leads. The upper curve represents the response of a thermocouple located at the panel center. The lower curve represents the response of the thermocouple located at the panel edge. The temperatures indicated represent the steady state equilibrium temperatures.

Obviously, many modifications and variations of the present invention are possible in light of the above teachings. For example, although it is noted that a prepreg technique is used to form the laminate, any standard technique for forming a laminate structure may be utilized such as a hot melt or use of a solvent for mixing and then painting. It is, therefore, to be understood that, within the scope of the appended claims, the invention may be practiced otherwise than as specifically described.

What is claimed and desired to be secured by Letters Patent of the United States is:

1. An electrically conductive structural composite which can be heated by application of an electrical current, comprising:
    (a) a plurality of layers of structural fabric which have been treated and prepreged with a laminating resin and cured into a laminate structure, at least one of said layers being a conductive layer of fabric which has been treated with conductive polymer produced by the steps of:
        (i) contacting an electrically insulating porous structural fabric with a liquid pyrrole,
        (ii) contacting said electrically insulating porous structural fabric with a solution of a strong oxidant capable of oxidizing pyrrole to a pyrrole polymer, and
        (iii) oxidizing said pyrrole by said strong oxidant in the presence of a substantially non-nucleophilic anion, and precipitating a conductive pyrrole polymer in the pores of said structural fabric; and
    (b) electrical conducting means in electrical contact with said conductive layer for providing passage of electrical current for joule heating of said structural composite.

2. The electrically conductive structural composite of claim 1, wherein said electrical conducting means includes a first electrical conductor at a first edge portion of said conductive layer and a second electrical conductor at a second edge portion of said conductive layer.

3. The electrically conductive structural composite of claim 2 wherein said first and second edge portions are located at opposite ends of said conductive layer.

4. The electrically conductive structural composite of claim 1 wherein said electrical conducting means includes a first layer of electrically conductive paint applied along a first edge portion of said conductive layer and a second layer of electrically conductive paint applied along a second edge portion of said conductive layer for providing an even application of heat upon introduction of an electric current.

5. The electrically conductive structural composite of claim 1, including a plurality of conductive fabric layers treated with conductive polymer.

6. The electrically conductive structural composite of claim 1, including two outer layers, said outer layers being non-conducting layers of said structural fabric which have been treated and prepreged with a laminating resin.

7. A structural composite for use on aircraft, comprising:
    (a) a plurality of layers of structural fabric which have been treated and prepreged with a laminating resin and cured into a laminate structure, at least one of said layers being a conductive layer of fabric which has been treated with conductive polymer produced by the steps of:
        (i) contacting an electrically insulating porous structural fabric with a liquid pyrrole,
        (ii) contacting said electrically insulating porous structural fabric with a solution of a strong oxidant capable of oxidizing pyrrole to a pyrrole polymer, and
        (iii) oxidizing said pyrrole by said strong oxidant in the presence of a substantially non-nucleophilic anion, and precipitating a conductive pyrrole polymer in the pores of said material; and
    (b) electrical conducting means in electrical contact with said conductive layer for providing passage of electrical current for joule heating of said structural composite during application of electrical current for de-icing of said structural composite during low temperature operation of the aircraft.

8. The electrically conductive structural composite of claim 1, said structural fabric being selected from the group consisting of a porous ceramic, a porous glass, a porous organic foam and woven and non-woven fabrics, and said laminating resin is selected from the group consisting of epoxy, polyimide and bismaleimide resins.

9. The electrically conductive structural composite of claim 1, said structural fabric being fiberglass fabric and said laminating resin being epoxy resin.

* * * * *